S. J. ANKER.
LANTERN SUPPORT.
APPLICATION FILED SEPT. 3, 1919.
1,366,710.
Patented Jan. 25, 1921.
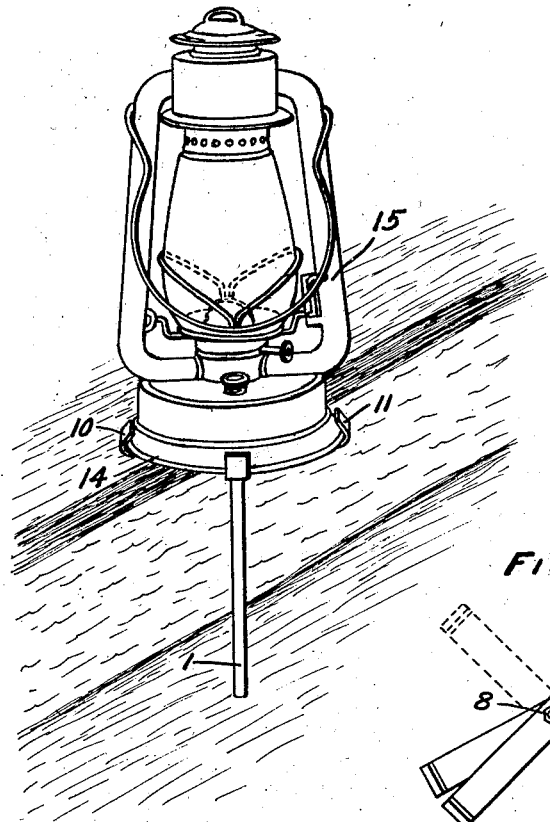
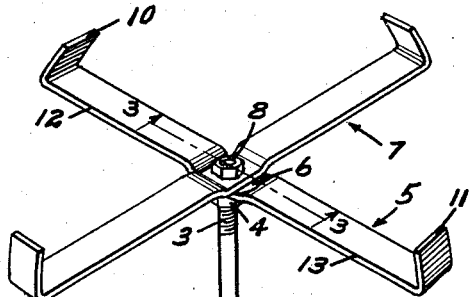
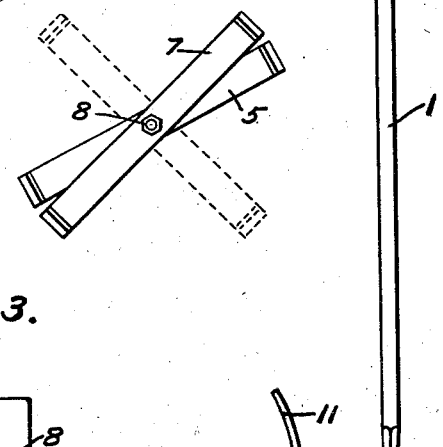
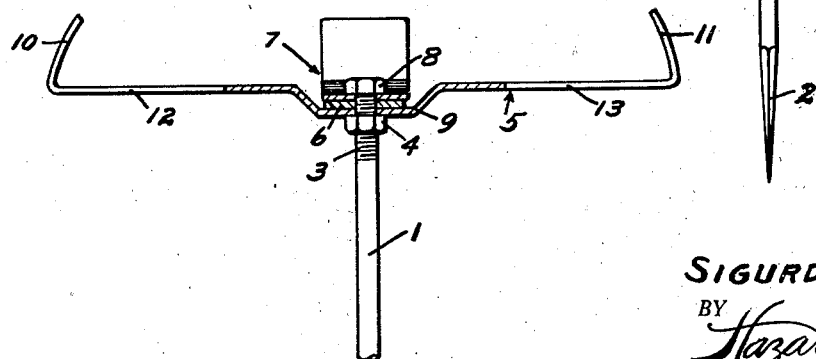
INVENTOR.
SIGURD J. ANKER

UNITED STATES PATENT OFFICE.

SIGURD J. ANKER, OF EL CENTRO, CALIFORNIA.

LANTERN-SUPPORT.

1,366,710.　　　　Specification of Letters Patent.　　Patented Jan. 25, 1921.

Application filed September 3, 1919. Serial No. 321,499.

*To all whom it may concern:*

Be it known that I, SIGURD J. ANKER, a citizen of the United States, residing at El Centro, in the county of Imperial and State of California, have invented new and useful Improvements in Lantern-Supports, of which the following is a specification.

My object is to make a lantern support, and my invention consists of the novel features herein shown, described and claimed.

Figure 1 is a perspective showing a lantern provided with a support in accordance with the principles of my invention.

Fig. 2 is an enlarged perspective of the support shown in Fig. 1.

Fig. 3 is an enlarged sectional detail on the line 3—3 of Fig. 2.

Fig. 4 is a top plan view illustrating the operation.

The iron stake 1 is a round rod having a sharpened point 2 and a screw-threaded upper end 3. A nut 4 is mounted upon the screw-threaded upper end 3. A cross arm 5 is mounted upon the stake 1 against the nut 4. A washer 6 is mounted upon the stake against the cross arm 5. A second cross arm 7 is mounted against the washer 6, and a nut 8 is mounted upon the stake against the cross arm 7.

The cross arm 5 is a piece of heavy strap iron and has an offset central portion 9 and ends 10 and 11 bent upwardly and inclined inwardly to form hooks to engage the bottom of the lantern. The cross arm 7 is similar in construction to the cross arm 5.

The straight horizontal arms 12 and 13 of the cross arms are on a level and above the upper face of the nut 8. The cross arms 5 and 7 swing upon the stake 1 as a pivot, so that when the cross arms are swung into substantially parallel positions, as in Fig. 4, the lantern rim 14 may be passed between the pairs of hooks at the opposite ends of the cross arms and then the cross arms may be swung into positions crosswise of each other and the hooks 10 and 11 will engage the rim 14 and hook around the rim and hold the lantern 15 in position.

The lantern support is especially adapted for supporting lanterns along irrigation ditches, dikes, and similar places where night work is to be performed, or where signals are to be mounted.

Various changes may be made without departing from the spirit of my invention as claimed.

I claim:

A lantern support including a stake threaded at its upper end, a nut screwing on said upper end, a cross arm formed with a depressed portion intermediate its ends provided with an aperture through which the upper end of said stake extends, said depressed portion resting upon said nut, hooks on the outer ends of said cross arms for engaging the base of a lantern, a washer for engaging the base of a lantern, a washer on the upper end of said stake resting upon said depressed portion of said arm, a second cross arm formed with a depressed portion intermediate its ends provided with an aperture through which the upper end of said stake extends, said depressed portion resting upon said washer within the depressed portion of said first cross arm, hooks on the ends of said second arm for engaging a lantern base, and a nut screwing on the upper end of said stake within the depressed portion of said second arm.

In testimony whereof I have signed my name to this specification.

SIGURD J. ANKER.